(No Model.) 2 Sheets—Sheet 1.

E. McCARTY.
COTTON CULTIVATOR AND CHOPPER.

No. 275,062. Patented Apr. 3, 1883.

Witnesses:
E. B. Stocking

Inventor:
Eugene McCarty
By

N. PETERS. Photo-Lithographer, Washington, D. C.

(No Model.) 2 Sheets—Sheet 2.

E. McCARTY.
COTTON CULTIVATOR AND CHOPPER.

No. 275,062. Patented Apr. 3, 1883.

Witnesses:
E. W. Johnson
H. H. Taylor

Eugene McCarty
Inventor

Attorney

UNITED STATES PATENT OFFICE.

EUGENE McCARTY, OF SPANISH FORT, TEXAS.

COTTON CULTIVATOR AND CHOPPER.

SPECIFICATION forming part of Letters Patent No. 275,062, dated April 3, 1883.

Application filed August 23, 1882. (No model.)

*To all whom it may concern:*

Be it known that I, EUGENE McCARTY, a citizen of the United States of America, residing at Spanish Fort, in the county of Montague and State of Texas, have invented certain new and useful Improvements in Cotton Cultivators and Choppers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of machines which are designed and employed for thinning out and cultivating rows of cotton-plants; and said invention consists in certain details of construction and combinations of devices, as hereinafter more fully described, and specifically set forth in the claims.

Figure 1:
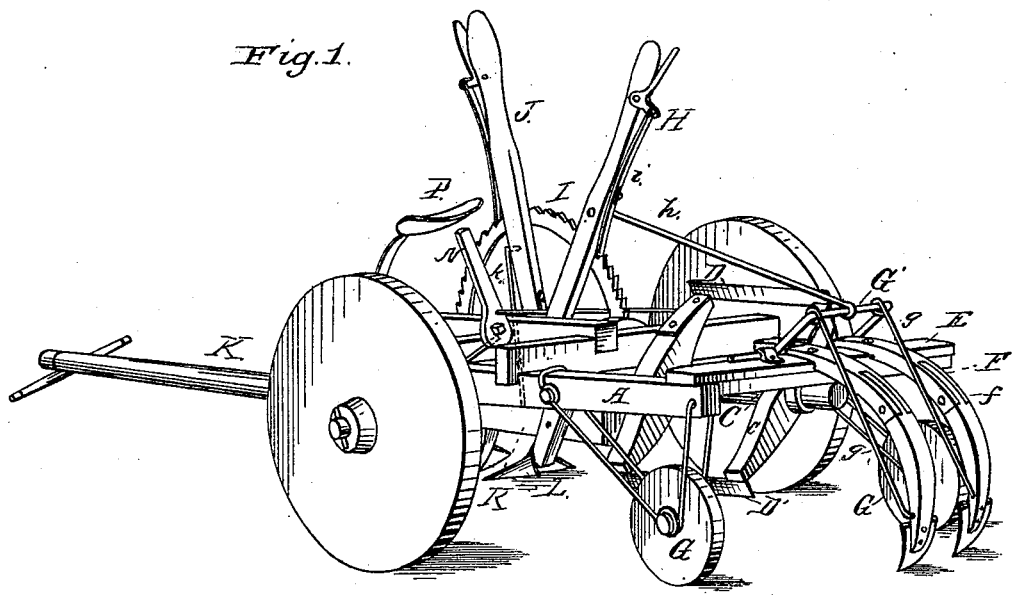
Figure 2:
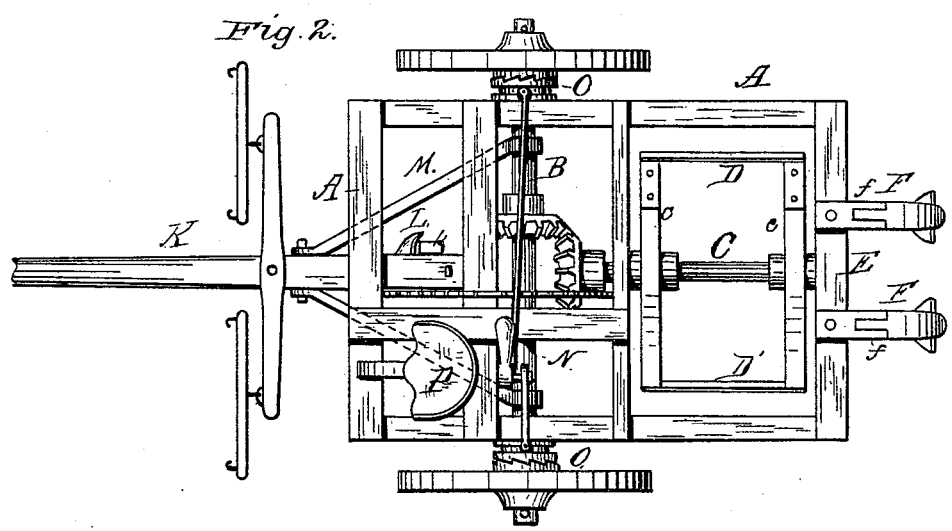
Figure 3:
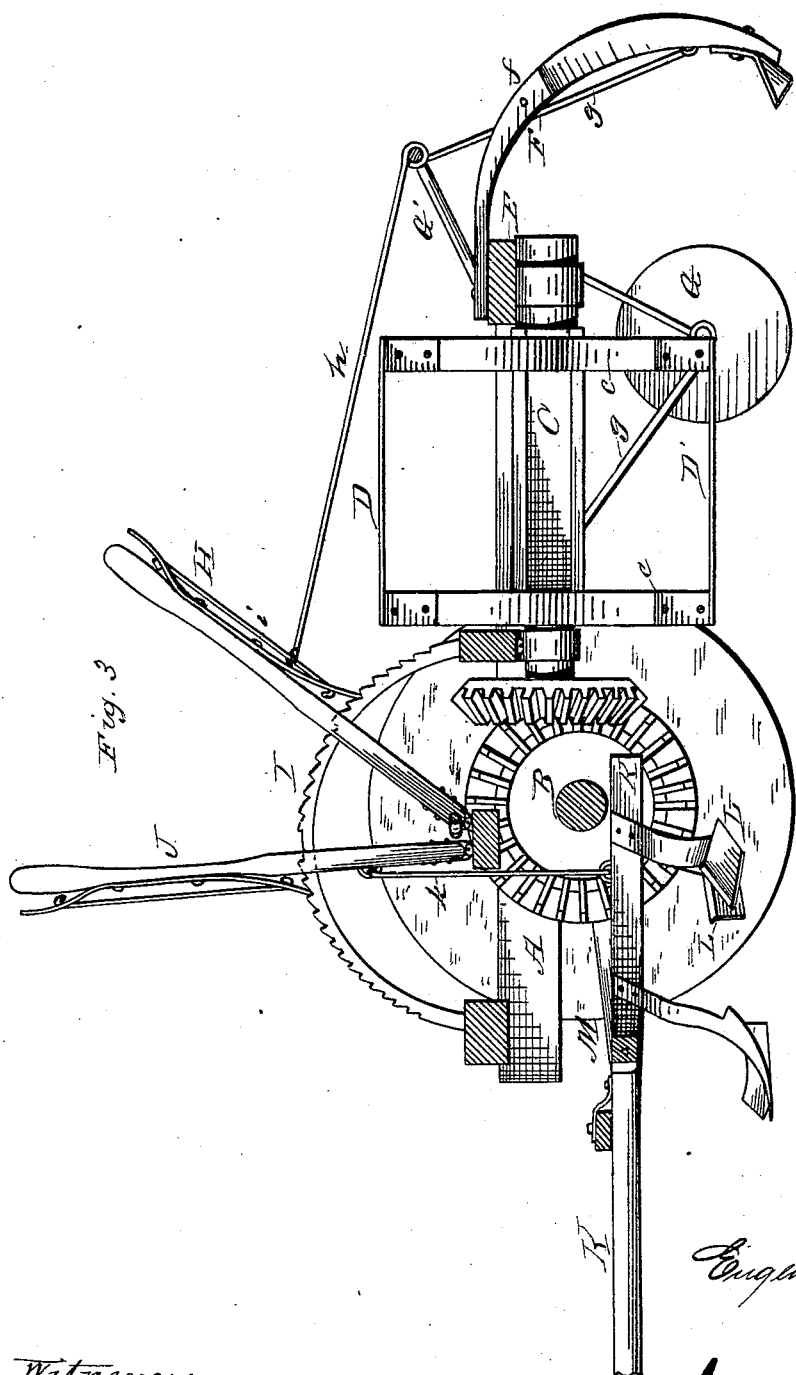

Figure 1 is a perspective of a machine embodying my invention. Fig. 2 is a plan view, and Fig. 3 is a longitudinal section.

Like letters of reference indicate like parts in all the figures.

A represents a rectangular frame supported upon the axle B and rear wheels G. At a right angle to the axle and miter geared thereto is a shaft, C, extending to the rear of the frame, and suitably journaled to the cross-beam E thereof. Rigidly attached to said shafts are two arms, *c c*, bearing at their outer ends knives D D'.

Upon the beam E are rigidly secured two curved standards, F, formed each of two sections, pivotally united at *f*, and provided at their lower free ends with shovel-plows. Each of the pivoted sections is connected to a pivoted bracket, G', by wires, chains, or ropes *g g*, said bracket being pivoted to said beam E, and connected by a wire, rope, or chain, *h*, to a lever, H, pivoted to the forward portion of the frame, and adapted, by a catch, *i*, and toothed sector I, to be retained in desired positions or lifted out of action. In the same portion of the machine is another lever, J, in like manner adapted to be retained in desired positions, and connected by a wire rope or chain, *k*, to the tongue K, at which point thereon are suitably attached two plowshares or scrapers, L L, the tongue being pivotally secured in hounds M, in advance of the plows. At one side of the lever J is a third lever, N, which operates at a right angle to levers J and H, and is connected by wire ropes or chains to clutches O O on the axle, the members of the clutch being operated to mesh with each other by a spring in the usual manner. To the forward part of the frame is adjustably secured a seat, P, in such locality as facilitates the operation of the three mentioned levers by a person seated thereon.

The operation of the machine is as follows: The machine is driven over each row, and as it advances the axle rotates and operates through the miter-gear the shaft bearing the knives, and these are rotated and operate to successively remove a portion of the plants, leaving separated sections of the row unremoved. At the same time the forward plows on the tongue have scraped and cleaned the soil of weeds, and the rear plows loosen and draw toward the row the adjacent soil. By operating the lever H the depth to which said rear plows shall reach is adjusted; or they may be entirely withdrawn from the soil, and by means of lever J the forward plows may be adjusted or withdrawn. When it is desired to stop the operation of the cutter-shaft and its knives, the third lever, N, is operated to throw the clutch O out of gear, when the object is accomplished and the machine is in condition to turn from one row to another. It will be noticed that the rear wheels relieve the rear plows or cultivators from undue weight and preserve a steady, uniform operation as to the depth to which they operate when once adjusted, as without said wheels the vertical oscillation of the frame-work upon the axle when the team mounts an elevation or enters a depression would tend to increase or lessen said depth. The forward lever also permits the complete withdrawal of the forward sets of plows attached to the tongue, and thus greatly facilitates turning at the ends of the rows.

Having described my invention and its operation, what I claim as new, and desire to secure by Letters Patent, is—

1. In a cotton chopper and cultivator, the combination of the frame A, the forward plows, L, and lever J, with the rear plows or cultivators mounted on sectional beams pivotally united and connected to a pivotal bracket operated by the lever H, substantially as shown and described.

2. The combination of the frame A, supported on the axle B and rear wheels, G, the tongue K, attached to the frame and provided with the scrapers L L, the lever J, and cord or wire k, with the sectional rear cultivator-beams, F, cords g g, bracket G', cord h, and lever H, substantially as shown and described.

In testimony whereof I affix my signature in presence of two witnesses.

EUGENE McCARTY.

Witnesses:
L. C. McNATT,
J. B. BUISE.